United States Patent
Cheng et al.

(10) Patent No.: US 9,635,204 B2
(45) Date of Patent: Apr. 25, 2017

(54) PARTIAL INFORMATION CAPTURE AND PROCESSING

(71) Applicant: International Business Machines Corporation, Armonk, NY (US)

(72) Inventors: Meilin Cheng, Jinan (CN); Jin Yang Li, Beijing (CN); Jing Quan, Beijing (CN); Qin Qiong Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/856,613

(22) Filed: Sep. 17, 2015

(65) Prior Publication Data

US 2017/0085732 A1  Mar. 23, 2017

(51) Int. Cl.
*H04N 1/00* (2006.01)
*H04N 1/028* (2006.01)

(52) U.S. Cl.
CPC ....... *H04N 1/00811* (2013.01); *H04N 1/0044* (2013.01); *H04N 1/00381* (2013.01); *H04N 1/00411* (2013.01); *H04N 1/00493* (2013.01); *H04N 1/0281* (2013.01); *H04N 2201/0091* (2013.01)

(58) Field of Classification Search
CPC ........... H04N 1/00798; H04N 1/00381; H04N 1/00411; H04N 1/00493; H04N 1/0281
USPC .......... 358/1.6, 1.5, 1.9, 1.18; 715/768, 863, 715/702; 345/173
See application file for complete search history.

(56) References Cited

U.S. PATENT DOCUMENTS

| | | | |
|---|---|---|---|
| 8,427,716 B2 | 4/2013 | Huang | |
| 8,441,694 B2 | 5/2013 | Dobbs | |
| 8,456,717 B2 | 6/2013 | Do et al. | |
| 8,520,224 B2 | 8/2013 | Nielsen et al. | |
| 2005/0231767 A1* | 10/2005 | Brake | G06F 3/0488 358/474 |

OTHER PUBLICATIONS

Stone et al., "How to Scan Documents and Images Using EPSON Scan," DMC Knowledge Base, p. 1-12, GroundWorks, http://specular.dmc.dc.umich.edu/GroundWorks/knowledgebase/scanning-2/how-to-scan-documents-and-images-using-epson-scan/, Accessed on Sep. 8, 2015.

* cited by examiner

*Primary Examiner* — Jamares Q Washington
(74) *Attorney, Agent, or Firm* — Robert C. Bunker (57) ABSTRACT

Embodiments of the present invention relate to a machine, a method and a computer program product for partial information capture and processing. A touch input that draws a pattern can be detected on a lid of a machine, where the lid is touch-sensitive and is operable to cover an object to be processed. Specifically, the lid allows a user to see at least a part of the object. In response to detecting the touch input on the lid, a part of the object is identified based on the pattern. Then the machine generates a processing result that only contains the identified part of the object.

20 Claims, 6 Drawing Sheets

PARTIAL INFORMATION CAPTURE AND PROCESSING

BACKGROUND

Scanners and copiers are commonly-used information capture and processing devices. A scanner is a device that optically scans an object such as an image, printed text, handwriting, and converts the object to a digital image. A copier duplicates information on a paper onto another one. Commonly used in offices are variations of the desktop flatbed device where the document is placed on a glass window for scanning. Portable scanners and copiers have been proposed as well. Modern scanners and copiers typically use charge-coupled devices (CCDs) or contact image sensor (CIS s) as image sensors. Traditionally, the scanners produce two-dimensional images of objects that are usually flat. Three-dimensional (3D) scanners may scan volumetric objects and generate their 3D models.

In operation of a scanner, a lid covers the object in order to provide a uniform background that the scanner software can use as a reference point for determining the size of the document being scanned. A light source is used to illuminate the document. A scan head may be composed of mirrors, lens, filter, and CCD array. The scan head is moved slowly across the object by a belt that is attached to a stepper motor. The image of the object is captured on a line-by-line basis and reflected by one mirror to another. In some scanners, there are only two minors while others use a three mirror approach. Each minor is slightly curved to focus the image it reflects onto a smaller surface. The last mirror reflects the image onto a lens which in turn focuses the image through a filter on the CCD array. Copiers work in a similar way to duplicate content on a paper onto another paper.

SUMMARY

In general, example embodiments of the present invention provide a machine, a method and a computer program product for partial information capture and processing.

In an aspect, a machine is provided. The machine comprises a lid, a scan head, and a processing unit. The lid is touch-sensitive and is operable to cover an object to be processed. In addition, the lid enables a user to see at least a part of the object. The scan head is located below the lid and operable to scan the object. The processing unit may detect a touch input that draws a pattern on the lid. In response to detecting the touch input on the lid, the processing unit may identify a part of the object based on the pattern, and to control the scan head to generate a processing result that only contains the identified part of the object.

In another aspect, a method is provided. The method comprises detecting a touch input that draws a pattern on a lid of a machine, where the lid is touch-sensitive and is operable to cover an object to be processed. In addition, the lid enables a user to see at least a part of the object. The method also comprises identifying, in response to detecting the touch input on the lid, a part of the object based on the pattern. The method further comprises generating a processing result that only contains the identified part of the object.

In yet another aspect, a computer program product is provided. The computer program product is tangibly stored on a non-transient machine-readable medium and comprises machine-executable instructions. When executed on a machine, the instructions cause the machine to detect a touch input that draws a pattern on a lid of the machine, where the lid is touch-sensitive and is operable to cover an object to be processed. The instructions further cause the machine to identify a part of the object based on the pattern in response to detecting the touch input on the lid, and to generate a processing result that only contains the identified part of the object.

It is to be understood that the Summary is not intended to identify key or essential features of embodiments of the present invention, nor is it intended to be used to limit the scope of the present invention. Other features of the present invention will become easily comprehensible through the description below.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Principle of the present invention will now be described with reference to some example embodiments. It is to be understood that these embodiments are described only for the purpose of illustration and help those skilled in the art to understand and implement the present invention, without suggesting any limitations as to the scope of the invention. The invention described herein can be implemented in various manners other than the ones describe below.

As used herein, the term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Figure 1:
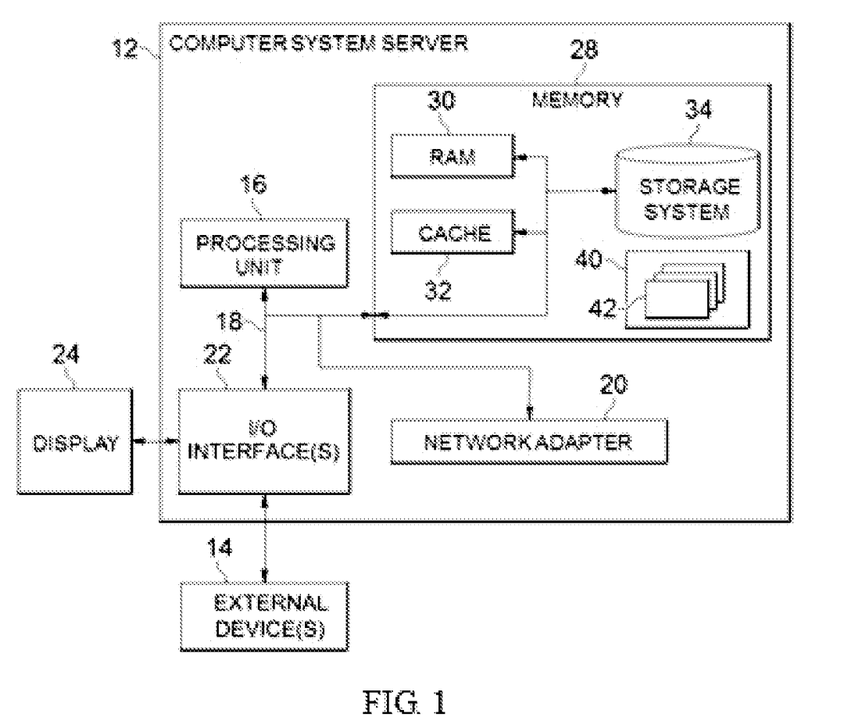
FIG. 1 is a block diagram of an electronic device in which embodiments of the present invention can be implemented.

Reference is first made to FIG. 1, in which an exemplary electronic device or computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, and the like. One or more devices that enable a user to interact with computer system/server 12; and/or any devices (e.g., network card, modem, etc.) that enable computer system/server 12 to communicate with one or more other computing devices. Such communication can occur via input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, and the like.

In computer system/server 12, I/O interfaces 22 may support one or more of various different input devices that can be used to provide input to computer system/server 12.

For example, the input device(s) may include a user device such keyboard, keypad, touch pad, trackball, and the like. The input device(s) may implement one or more natural user interface techniques, such as speech recognition, touch and stylus recognition, recognition of gestures in contact with the input device(s) and adjacent to the input device(s), recognition of air gestures, head and eye tracking, voice and speech recognition, sensing user brain activity, and machine intelligence.

Some example embodiments of the machine and the associated method for partial information capture and processing will be described in the following paragraphs. Conventional scanners and copiers do not support partial scan or copy of an object. Considering a two-dimensional (2D) scanner as an example, at present, the scanning is performed with respect to the individual whole pages of the document. That is, the scanner cannot just scan a paragraph(s) or an image(s) on a page in an automated fashion. If a user desires to do so, he/she has to keep out the other parts of the page manually, for example, using a mask such as another paper. Another way is to use image editing/processing applications to post-process the image generated by the scanner in order to remove the unwanted parts. These approaches increase the users' burden. The similar problem exists in other kinds of information capture and processing machines such as copiers.

In accordance with embodiments of the present invention, a machine is proposed to enable the partial information capture and processing by means of a lid that can sense input from the user. In operation, the object to be processed is covered by the lid in such a way that the user can directly see at least a part of the object. For example, the lid can be made by transparent material. The user is thus allowed to indicate one or more effective parts of the object he/she wants to scan or copy by interacting with the lid. In some embodiments, the user can draw a pattern to indicate the effective part using a stylus or a finger, for example. In response, the machine automatically identifies and processes the part of the object as desired by the user.

For the sake of discussion, several embodiments will be described with reference to 2D scanners where the object to be scanned is a paper document that can include printed text, handwriting, sketch and/or pictures. This is merely for the purpose of illustration without suggesting any limitation as to the scope of the invention. For example, the principles of the present invention as taught in this disclosure apply to 3D scanners and other information capture and processing machines such as copiers. For example, similar to the scanner, a copier can as well utilize a scan head that moves across the document to capture optical signals. The difference lies in that the copier prints the content onto a paper rather than producing a digital image.

Figure 2A:
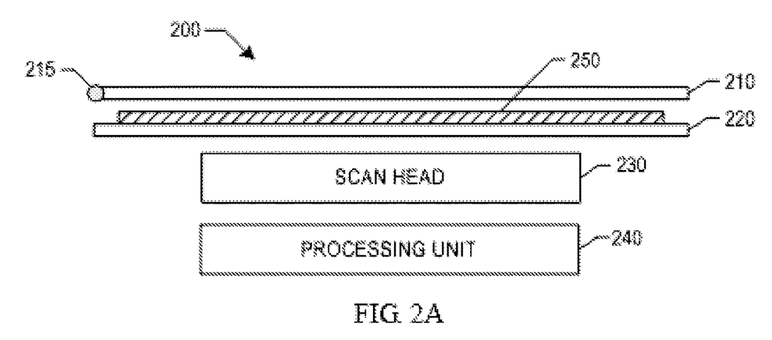
FIGS. 2A and 2B are block diagrams of scanners enabling partial scan in accordance with embodiments of the present invention.

FIG. 2A shows the block diagram of a scanner 200 in accordance with one example embodiment of the present invention. As shown, the scanner 200 includes a lid 210, a plate 220, a scan head 230, and a processing unit 240. The user may place the object 250 to be scanned on the plate 220 which is usually made of transparent material such as glass. The scan head 230 operates to scan the object 250 on the plate 220 and generate the image of the object 250. Example embodiments of the scan head 230 will be described in the following paragraphs. The processing unit 240 is at least coupled to the lid 210 and the scan head 230 to control the operations thereof. The processing unit 240 may be implemented by any suitable device including, but not limited to, a general purpose processor, an application specific processor, a controller, a microcontroller, or the like.

Figure 2B:
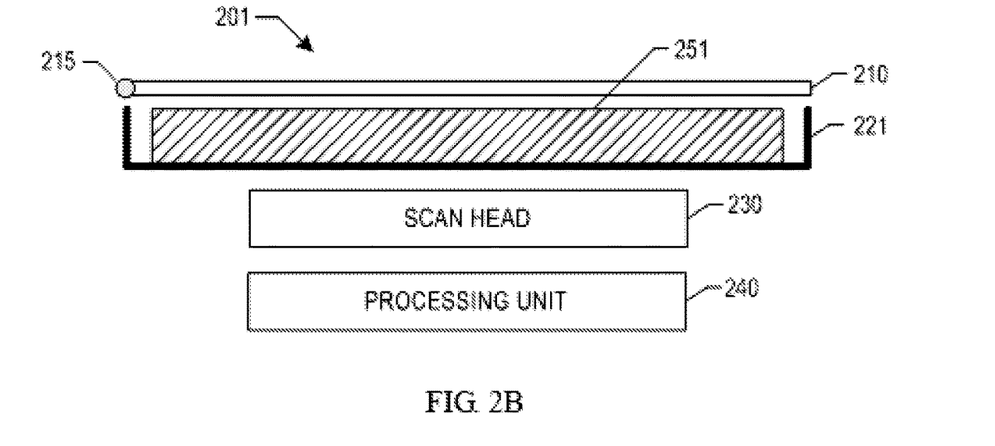

FIG. 2B shows the block diagram of a scanner 201 in accordance with another example embodiment of the present invention. Compared with the scanner 200 in FIG. 2A, in the scanner 201, the flat plate 220 is replaced with a container 221 that can receive 3D object to be scanned. As such, the scanner 201 is capable of scanning 3D objects with certain volumes. Other variations are possible as well.

As shown in FIGS. 2A and 2B, the lid 210 of the scanner 200 or 201 is operable to cover the object 250 to be scanned. For example, in one embodiment, the lid 210 can be opened or closed by means of a pivot 215. Unlike the lids on conventional scanners which are made of opaque materials such as plastics, in accordance with embodiments of the present invention, the lid 210 can be made of transparent material. As used herein, the transparent material includes translucent material. That is, the lid 210 may be made of any suitable material as long as the user can see the object 250 and the content thereon through the lid 210 after the lid 210 is covered onto the object 250.

In alternative embodiments, the lid 210 allows the user to see the content of the object 250 in other ways. For example, in one embodiment, the lid 210 may include a film display thereon. An image sensor (not shown) may be deployed, for example, on the lower surface of the lid 210 and captures an image(s) of the object. The processing unit 240 causes the captured image to be displayed on the lid 210 for the user's review. In such embodiments, the lid 210 does not necessarily have to be made of transparent material.

In accordance with embodiments of the present invention, the lid 210 is capable of sensing and accepting user input. For example, in some embodiments, the lid 210 may include a transparent, touch-sensitive surface that receives input from the user based on haptic touch. The touch-sensitive surface of the lid 210 may detect touch and any movement or breaking thereof using any of a plurality of touch sensing technologies either currently known or later developed. Examples of the touch sensing technologies include, but are not limited to, capacitive, resistive, infrared, and surface acoustic wave technologies. Alternatively, or in addition, it is possible to utilize other proximity sensor arrays or other elements for determining one or more points of touch with the lid 210.

The user may interact with the lid 210 using any suitable tool or appendage, such as a stylus, a finger, an electronic pen, and the like. For example, in some embodiments, the lid 210 is designed to work primarily with finger-based touches and gestures. The processing unit 240 may translate the rough finger-based input into a precise pointer/cursor position or command for performing the actions desired by the user. It is to be understood that in the context of the present disclosure, a touch by the user does not necessarily means a physical contact. For example, for the lid 210 equipped with a proximity sensor, a user can interact with the scanner 200 or 201 by placing his/her finger(s) near the lid 210 without actually contacting it.

As an example, in one embodiment, the lid 210 includes a glass sensor which is visually penetrable as it is made by specialty glass. Via conducting technology, light-emitting diode (LED) emits light with invisible circuit. The glass includes liquid crystal molecules. Once touch-based input is received, electrically controlled glass will be activated by the electric current. These liquid crystal molecules are rearranged in accordance with the user's input, which can be detected by the processing unit 240. It is to be understood that the glass sensor is just an example implementation of the lid 210, without suggesting any limitation as to scope of the invention. The lid 210 may include other types of transparent sensing materials such as transparent touch-sensitive film or the like.

Figure 3:
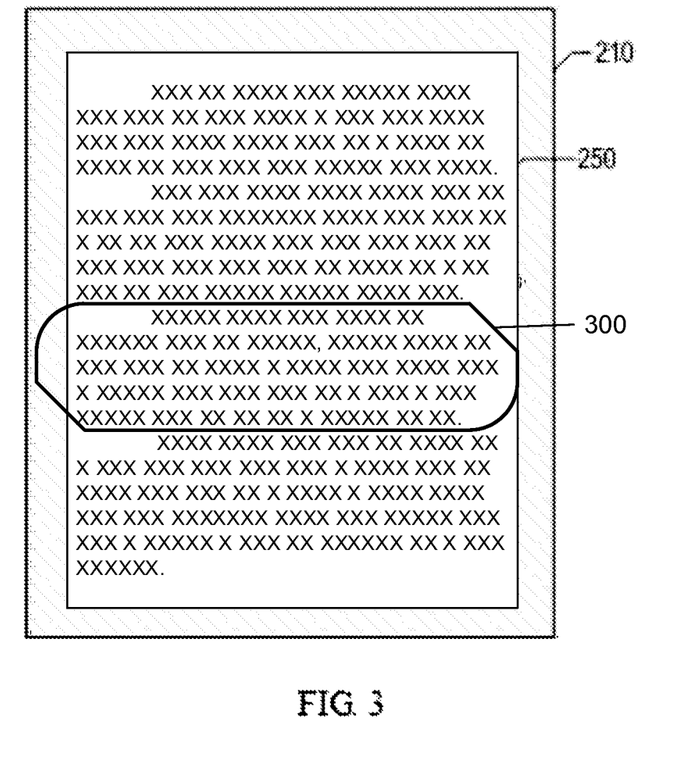
FIG. 3 is a top view of a scanner enabling partial scan in accordance with embodiments of the present invention.

Since the lid 210 includes a transparent sensor, the user can indicate the effective part on the object 250 he/she wants to scan via the lid 210. FIG. 3 shows a top view of the scanner 200 where the object 250 is a page containing several paragraphs of printed text. In this example, the lid 210 is transparent. As shown, the content on the page 250 is visible to the user through the transparent lid 210. The user may use a stylus or his/her finger to draw a pattern 300 on the lid 210 which includes the effective part on the page 250. In this example, the effective part to be scanned includes a text paragraph. The pattern 300 may be a closed or essentially closed shape.

Upon detecting the touch input on the lid 210, the processing unit 240 determines whether the user is drawing an essentially closed pattern (such as the pattern 300 in FIG. 3). If so, the processing unit 240 identifies the effective part of the object 250 that corresponds to the pattern. For example, if the pattern 300 is of a regular shape like a rectangle or a circle, the pattern 300 may be directly projected onto the object 250 in the vertical direction, thereby determining the effective part on the object 250. If the pattern 300 is of an irregular shape, in one embodiment, the processing unit 240 may calculate the bounding box of the pattern 300 on the lid 210 and then identify the effective part by projecting the bounding box.

In some embodiments, the pattern 300 and/or the identified effective part of the object 250 may be visually presented to the user. In this way, the user can check whether the scanner correctly recognizes the exact part he/she wants to scan. To this end, in some embodiments, a transparent or translucent film-form display may be attached to the lid 210. An example of such a display is thin film transistor liquid crystal display (TFT LCD). The processing unit 240 may cause the pattern 300 to be rendered on the display. Alternatively, in other embodiments, the scanner 200 or 201 may include a light source such as a lamp(s). The processing unit 240 may control the lamp to illuminate the identified effective part.

In some embodiments, the user may modify and/or remove the pattern 300 by gestures, for example. In one embodiment, the user may select the pattern 300 by performing a predefined gesture such as a tap or a double-tap on the lid 210 within the scope of the pattern 300. Then the user may drag the pattern 300 to change its position on the lid 210. Once the user releases his/her finger or the stylus from the lid 210, the processing unit 240 updates the effective part accordingly. Likewise, in one embodiment, the user may perform a predefined gesture such as a swipe gesture on the lid 210 to remove the pattern 300.

After the user confirms the effective part and initiate the scanning, the processing unit 240 controls the scan head 230 to generate and output a scan result that only contains the effective part of the object 250. That is, the scan result does not contain any part outside the effective part of the object 250. By way of example, it is supposed that the object 250 is a page in a paper document and that the pattern 300 covers a text paragraph and a picture printed on the page. In accordance with embodiments of the present invention, the image output by the scanner only contains the paragraph and the picture, without any other content on the page.

The partial scan based on the identified effective part on the object 250 can be achieved in a variety of ways. Example embodiments will be described with reference to FIG. 4 which shows an example implementation of a scanner 400 in accordance with one example embodiment of the present invention. In the scanner 400, the scan head 230 includes a light source 431 and an optical array which includes mirrors 432 and 433 in this example. The light source 431 may be a lamp implemented by Xenon, LED or cold cathode fluorescent, for example. The light source 431 is movable along an axis 434 which can be parallel with the plate 220. The mirror 432 is movable along another axis 435 which is parallel to the axis 434. The light source 431 is operable to illuminate the object 250. The light is reflected from the object 250 to the mirrors 432 and 433 and captured by an image sensor 436 which digitalizes the received optical signal to generate the output image. The image sensor 436 may be a CCD which typically contains three rows (arrays) of sensors with red, green, and blue filters.

Figure 4:
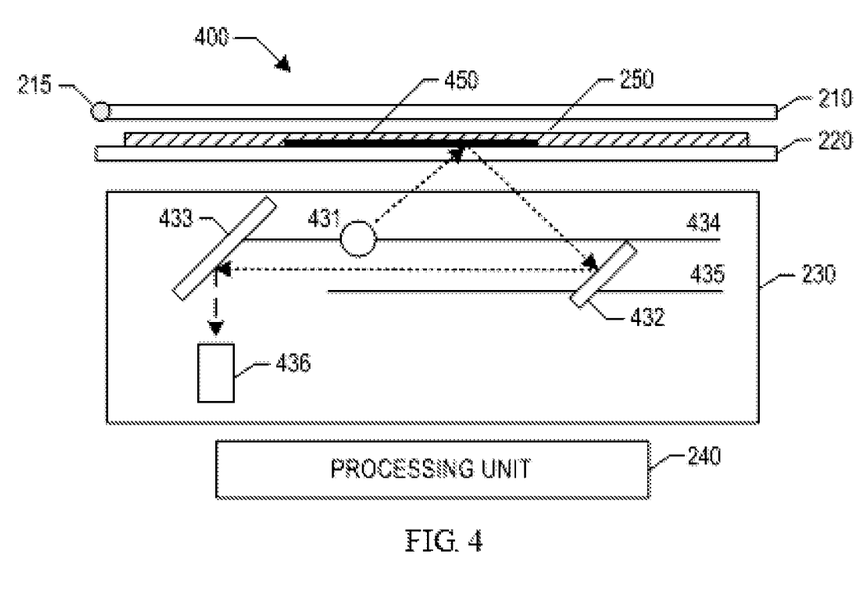
FIG. 4 is a block diagram of an example implementation of the scanner enabling partial scan in accordance with embodiments of the present invention.

In some embodiments, the processing unit 240 enables the light source 431 only to illuminate the effective part 450 of the object 250. More particularly, since the movable light source 431 is controlled by the processing unit 240, the processing unit 240 can determine the point of incidence of the light emitted by light source 431 on the object 250. At any given time instant, the point of incidence can be determined based on the current position and the emission angle of the light source 431. As such, the processing unit 240 may control the light sources 431 to illuminate the object only if the point of incidence falls within the scope of the effective part 450. Any other content on the page outside the effective part 450 will not be illuminated. As a result, the image generated by the image sensor 436 only contains the effective part 450.

Alternatively, or in addition, the processing unit 240 may enable the image sensor 436 only to receive the light reflected by the optical array (minors 432 and 433) from the effective part 450 of the object 250. That is, under control of the processing unit 240, the image sensor 436 does not work when the point of incidence of the light emitted by the light source 431 falls outside the effective part 450. In this way, the content outside the effective part 450 can be excluded from the scan result as well.

Figure 5:
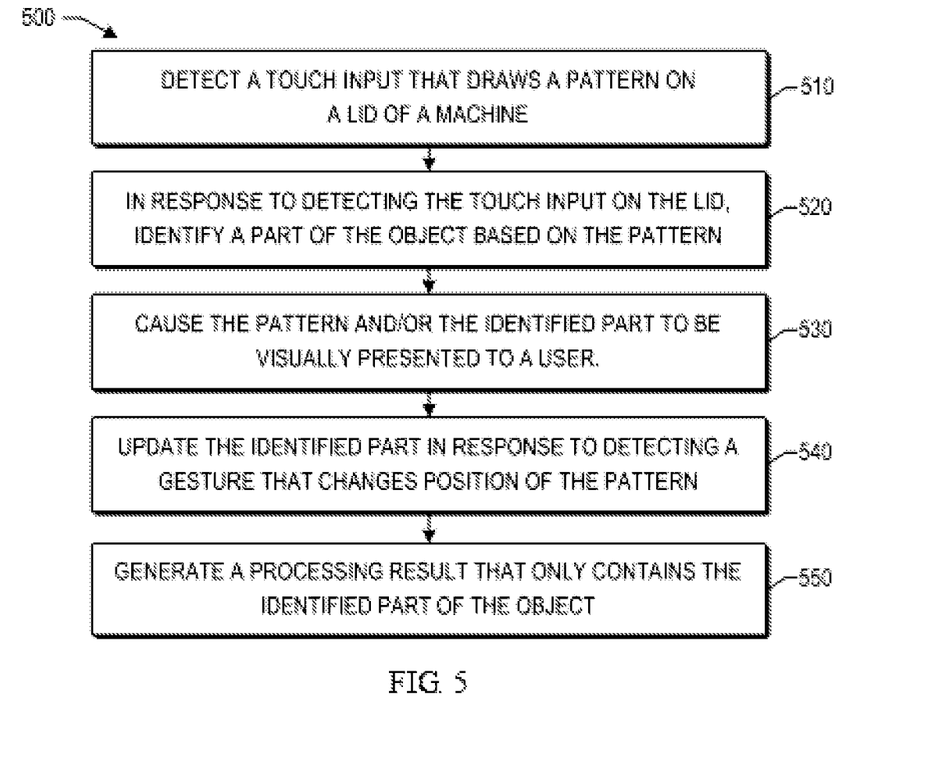
FIG. 5 is a flowchart of a method for partial information capture and processing in accordance with embodiments of the present invention.

FIG. 5 shows a flowchart of a method 500 for partial information capture and processing in accordance with example embodiments of the present invention. The method 500 may be carried out by the processing unit 240 of the scanner 200, 201 or 400 or other devices such as copiers.

In step 510, a touch input that draws a pattern is detected on a lid of a machine. The lid is operable to cover an object to be processed and allows the user to see at least a part of the covered object, as described above. For example, the lid may include a glass sensor capable of accepting touch input from the user.

In response to detecting the touch input on the lid, in step 520, the effective part of the object is identified based on the pattern. For example, if the pattern is a regular shape, the pattern may be vertically projected onto the object to determine the effective part to be scanned. Otherwise, for an irregular shape, the bounding box of the pattern can be determined and projected to determine the effective part.

In some embodiments, in step 530, the pattern and/or the identified part can be visually presented to the user of the machine. In some embodiments, in step 540, the identified part of the object may be updated in response to detecting a gesture that changes a position of the pattern on the lid.

In step 550, a processing result that only contains the identified part of the object is generated. For example, in some embodiments, the machine includes a scan head having a light source operable to illuminate the object while the scan head moves across the object. In such embodiments, the processing result may be generated by causing the light source only to illuminate the identified part of the object. In some embodiments, the machine may include a scan head having an optical array and an image sensor, where the image sensor is operable to capture light reflected by the optical array. In such embodiments, the processing result may be generated by causing the image sensor only to capture the light reflected by the optical array from the identified part of the object.

The present invention may be a system, an apparatus, a device, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present invention. In this regard, each block in the flowchart or block diagrams may represent a module, snippet, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A machine comprising:
    a lid operable to cover an object to be processed by the machine, the lid being touch-sensitive and enabling a user to see the object, wherein the lid includes an image sensor that is capable of capturing an image of the object and displaying the captured image on the lid for the user to review;
    a plate located below the lid for receiving the object, wherein the plate includes a container that is capable of receiving three-dimensional objects to enable the machine to scan the received three-dimensional objects;
    a scan head located below the lid and the plate, and operable to scan the object;
    a processing unit capable of performing a method comprising:
    detecting a touch input that draws a pattern on the lid;
    in response to detecting the touch input on the lid, identifying a part of the object based on the pattern; and
    controlling the scan head to generate a processing result that only contains the identified part of the object.

2. The machine of claim 1, wherein the scan head includes a light source operable to illuminate the object while the scan head moves across the object, and
    wherein the processing unit generates the processing result by enabling the light source only to illuminate the identified part of the object.

3. The machine of claim 1, wherein the scan head includes an optical array and an image sensor, the image sensor being operable to capture light reflected by the optical array, and
    wherein the processing unit generates the processing result by enabling the image sensor only to capture the light reflected by the optical array from the identified part of the object.

4. The machine of claim 1, wherein the processing unit identifies the part by:
    determining a bounding box of the pattern on the lid; and
    identifying the part of the object by projecting the bounding box in a vertical direction.

5. The machine of claim 1, wherein the processing unit causes at least one of the pattern and the identified part to be visually presented to the user.

6. The machine of claim 1, wherein the processing unit updates the identified part of the object in response to detecting a gesture that changes a position of the pattern on the lid.

7. The machine of claim 1, wherein the lid includes an image sensor that is made of transparent material including a glass sensor operable to receive the touch input.

8. A method comprising:
    using a plate to receive an object, wherein the plate is capable of receiving three-dimensional objects to scan;

detecting a touch input that draws a pattern on a lid of a machine, the lid being touch-sensitive and operable to cover an object to be processed by the machine, the lid enabling a user to see the object, wherein the lid includes an image sensor that is capable of capturing an image of the object and displaying the captured image on the lid for the user to review;

in response to detecting the touch input on the lid, identifying a part of the object based on the pattern; and using a scan head located below the lid and the plate to generate a processing result that only contains the identified part of the object.

9. The method of claim 8, wherein the machine includes a scan head having a light source operable to illuminate the object while the scan head moves across the object, and wherein generating the processing result comprises causing the light source only to illuminate the identified part of the object.

10. The method of claim 8, wherein the machine includes a scan head having an optical array and an image sensor, the image sensor being operable to capture light reflected by the optical array, and wherein generating the processing result comprises causing the image sensor only to capture the light reflected by the optical array from the identified part of the object.

11. The method of claim 8, wherein identifying the part of the object comprises:

determining a bounding box of the pattern on the lid; and identifying the part of the object by projecting the bounding box in a vertical direction.

12. The method of claim 8, further comprising:

causing at least one of the pattern and the identified part to be visually presented to the user.

13. The method of claim 8, further comprising:

updating the identified part of the object in response to detecting a gesture that changes a position of the pattern on the lid.

14. The method of claim 8, wherein the lid includes an image sensor that is made of transparent material including a glass sensor, and wherein detecting the touch input on the lid comprises:

detecting the touch input via the glass sensor.

15. A computer program product being tangibly stored on a non-transient machine-readable medium and comprising machine-executable instructions, the instructions, when executed on a machine, causing the machine to perform a method comprising:

using a plate to receive an object, wherein the plate is capable of receiving three-dimensional objects to scan;

detecting a touch input that draws a pattern on a lid of a machine, the lid being touch-sensitive and operable to cover an object to be processed by the machine, the lid enabling a user to see the object, wherein the lid includes an image sensor that is capable of capturing an image of the object and displaying the captured image on the lid for the user to review;

in response to detecting the touch input on the lid, identifying a part of the object based on the pattern; and using a scan head located below the lid and the plate to generate a processing result that only contains the identified part of the object.

16. The computer program product of claim 15, wherein the machine includes a scan head having a light source operable to illuminate the object while the scan head moves across the object, and wherein the instructions, when executed on the machine, cause the machine to generate the processing result by causing the light source only to illuminate the identified part of the object.

17. The computer program product of claim 15, wherein the machine includes a scan head having an optical array and an image sensor, the image sensor being operable to capture light reflected by the optical array, and wherein the instructions, when executed on the machine, cause the machine to generate the processing result by causing the image sensor only to capture the light reflected by the optical array from the identified part of the object.

18. The computer program product of claim 15, wherein the instructions, when executed on the machine, cause the machine to:

determine a bounding box of the pattern on the lid; and identify the part of the object by projecting the bounding box in a vertical direction.

19. The computer program product of claim 15, wherein the instructions, when executed on the machine, further cause the machine to:

cause at least one of the pattern and the identified part to be visually presented to the user.

20. The computer program product of claim 15, wherein the instructions, when executed on the machine, further cause the machine to:

update the identified part of the object in response to detecting a gesture that changes a position of the pattern on the lid.

* * * * *